(12) United States Patent
Garton

(10) Patent No.: US 9,894,836 B2
(45) Date of Patent: Feb. 20, 2018

(54) MACHINE OPERATION ENHANCEMENT

(71) Applicant: Deere & Company, Moline, IL (US)

(72) Inventor: Michael S. Garton, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/995,948

(22) Filed: Jan. 14, 2016

(65) Prior Publication Data

US 2017/0202143 A1 Jul. 20, 2017

(51) Int. Cl.
*A01D 41/127* (2006.01)
*G05B 15/02* (2006.01)

(52) U.S. Cl.
CPC ......... *A01D 41/1271* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 6,283,853 B1 | 9/2001 | Pellenc et al. | |
| 6,863,604 B2* | 3/2005 | Behnke | A01D 41/127 460/6 |
| 9,516,812 B2* | 12/2016 | Baumgarten | A01D 41/127 |
| 2010/0217474 A1 | 8/2010 | Baumgarten et al. | |
| 2014/0224896 A1* | 8/2014 | Linz | A01C 17/006 239/11 |

\* cited by examiner

*Primary Examiner* — Rami Khatib
(74) *Attorney, Agent, or Firm* — Joseph R. Kelly; Kelly, Holt & Christenson PLLC

(57) ABSTRACT

A machine is controlled to operate according to a first control configuration. Enhancement criteria values, that are indicative of an enhancement metric, are evaluated based on operation in the first control configuration. The machine is then controlled to operate according to a second control configuration, and the enhancement criteria are again evaluated. The machine is iteratively switched between operating in the first and second control configurations until a signal-to-background-variation-ratio with respect to the evaluated enhancement criteria is sufficient. One of the first and second control configurations are then identified as corresponding to a best enhancement criteria value.

13 Claims, 12 Drawing Sheets

MACHINE OPERATION ENHANCEMENT

FIELD OF THE DESCRIPTION

The present description relates to enhancing the operation of a machine. More specifically, the present description relates to enhancing the operation of a machine by iteratively comparing enhancement measuring criteria generated while operating the machine in different machine configurations.

BACKGROUND

There are a wide variety of different types of mobile machines. Such machines can include agricultural machines, construction machines, machines that operate in forestry and turf management environments, among others. Many of these types of machines have a variety of different sensors that sense variables and generate sensor signals indicative of those variables. The sensor signals are used by a control system to control various controllable subsystems, based upon the sensor signals.

In controlling the controllable subsystems, the control system often varies or adjusts different control parameters to improve the operation of the machine. For instance, the control system may vary settings, control algorithms, or control system output values in order to improve the efficiency or other operational characteristics of the machine.

The discussion above is merely provided for general background information and is not intended to be used as an aid in determining the scope of the claimed subject matter.

SUMMARY

A machine is controlled to operate according to a first control configuration. Enhancement criteria values, that are indicative of an enhancement metric, are evaluated based on operation in the first control configuration. The machine is then controlled to operate according to a second control configuration, and the enhancement criteria are again evaluated. The machine is iteratively switched between operating in the first and second control configurations until background signal variations are sufficiently normalized with respect to the evaluated enhancement criteria. One of the first and second control configurations are then identified as corresponding to a best enhancement criteria value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
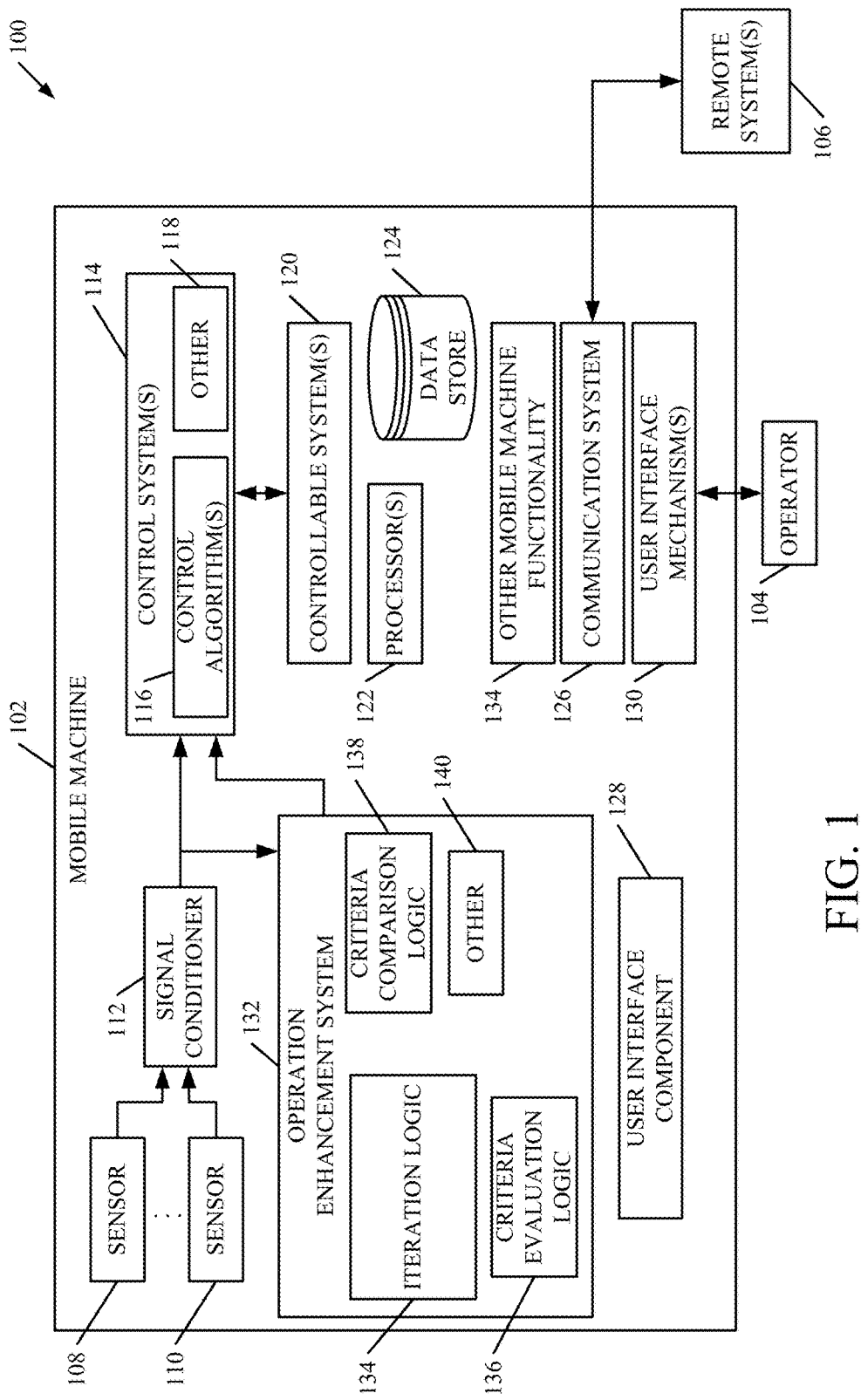
FIG. 1 is a block diagram of one example of a mobile machine architecture.

FIG. 1 is a block diagram of one example of a mobile machine architecture 100. Architecture 100 includes mobile machine 102 that is operated by operator 104. In one example, mobile machine 102 can also communicate with one or more remote systems 106. In the example shown in FIG. 1, mobile machine 102 illustratively includes sensors 108-110 which sense variables and provide sensor signals to signal conditioner 112. Signal conditioner 112 can perform a variety of different types of signal conditioning on the sensor signals, such as linearization, compensation, normalization, amplification, etc. The conditioned signals are output to control system 114 which, itself, illustratively includes one or more control algorithms 116, and it can include other items 188. Control system 114 illustratively generates control signals and provides them to controllable systems 120 to control the controllable systems 120.

Controllable systems 120 can be a wide variety of different types of systems or subsystems, depending on the type of mobile machine 102. For instance, when mobile machine 102 is a combine, controllable subsystems 120 may include a first set of subsystems such as those described below with respect to FIG. 6. However, when mobile machine 102 is a different machine, such as a cotton harvesting machine, a sugarcane harvester, construction machines, turf management or forestry machines, then the controllable subsystems 120 will be different types of subsystems. Some examples of those are also described below.

Machine 102 also illustratively includes one or more processors or servers 122, data store 124, communication system 126, user interface component 128, user interface mechanisms 130, and operation enhancement system 132. It can include a wide variety of other mobile machine functionality 134 as well. Before describing the operation of machine 102 in more detail, a brief overview of the operation, and of some of the items in machine 102, will first be provided.

Communication system 126 can illustratively communicate with one or more remote systems 106. This can be done over a wide variety of different types of communication links, such as a wide area network (e.g., the Internet), a cellular network, a near field communication link, or using other links, systems or networks.

User interface component 128 illustratively controls user interface mechanisms 130 to generate user interface outputs for operator 104, and to detect operator inputs using mechanisms 130. User interface mechanisms 130 can include a wide variety of different types of mechanisms, such as a touch sensitive display screen that displays information and can receive user inputs through displayed user input mechanisms (such as buttons, links, icons, etc.). Mechanisms 130 can also include levers, steering wheels, foot pedals, joysticks, point and click devices, mechanical linkages, and a wide variety of other mechanisms. Operator 104 illustratively provides operator inputs through user interface mechanisms 130 in order to control and manipulate mobile machine 102. The user interface mechanisms can also include a variety of different types of output mechanisms, such as display devices, audio devices, haptic feedback devices, etc. All of these and other mechanisms are contemplated herein.

In one example, operation enhancement system 132 illustratively includes iteration logic 134, criteria evaluation logic 136, criteria comparison logic 138, and it can include other items 140. In one example, system 132 is provided to optimize, or otherwise enhance, the operation of mobile machine 102, based on one or more different measurable or calculatable criteria. In one example, the measurable criteria may be harvesting efficiency, fuel efficiency, or any one or more of a wide variety of other criteria. System 132 illustratively receives the conditioned sensor signals from conditioner 112, and criteria evaluation logic 136 evaluates the criteria for which operation is being optimized or enhanced. Iteration logic 134 then provides an output signal to control system 114 to change the control configuration used in controlling controllable systems 120. For instance, system 114 can change the particular control algorithm 116 being used to control the controllable systems 120, it can change the machine settings used in controlling the controllable systems 120, or it can change any of a wide variety of other machine configuration inputs or other changeable or variable control parameters.

Control system 114 switches and begins controlling the controllable systems 120 according to the new control configuration (e.g., the new algorithm or control parameters), and criteria evaluation logic 136 then evaluates the optimization (or operational enhancement) criteria using the new control configuration. Criteria comparison logic 138 then compares the optimization (or operational enhancement) criteria using both the first control configuration (e.g., the first set of parameters or the first control algorithm) and using the second control configuration (e.g., the second set of parameters or the second control algorithm). The results of the comparison are stored (such as in data store 124 or elsewhere). This process continues with iteration logic 134 providing a signal to control system 114 so that control system 114 iterates between controlling the controllable systems 120 based on the first control configuration and controlling controllable systems 120 based upon the second control configuration. The iteration continues until the background signal variations that would normally mask changes in the signals used to evaluate the optimization (or operational enhancement) criteria have been sufficiently normalized out. At that point, criteria comparison logic 138 identifies which control configuration (e.g., which set of control parameters or which control algorithm) corresponds to the best criteria value for the optimization (or operational enhancement) criteria, and provides a signal to control system 114 so that control system 114 uses that control configuration to control the controllable systems 120.

It will be noted that operation enhancement system 132 can repeat this process numerous times, for numerous different control configurations. Also, it can repeat this process for the same control configuration to accommodate for changing conditions. For instance, it may be that a first control configuration might cause mobile machine 102 to operator more efficiently under certain crop conditions. However, a second control configuration may cause machine 102 to operate more efficiently when the crop conditions change. Thus, system 132 can repeat the operation, as desired, to identify the particular control parameters or the particular control algorithm that causes machine 102 to operate in a desired way, under the current conditions.

A brief discussion of the noise and signal variation in the sensing environment is now provided. It will first be noted that it can be very difficult to measure different variables (or to calculate variables based on sensor signal inputs) accurately. This is because, in agricultural machines, construction machines, etc., the environment in which the sensors operate can be very noisy. In addition, the sensors themselves (or other sensing instrumentation) can vary widely in its accuracy and precision. Further, the conditions under which the sensors and mobile machine are operating can also vary widely. By contrast, the measured characteristic (e.g., the signal amplitude) may have a relatively small change in value due to changing the machine control configuration.

Thus, it can be seen that when trying to measure changes in a sensor signal characteristic (such as amplitude), the measured characteristic can be affected by a number of different sources of error. They include a relatively large varying value (that varies over time), due to variability in the crop characteristic being sensed. There may also be error due to instrument accuracy limitations, poor calibration, or drift. There may also be error due to electrical interference, vibration, etc. The ratio of the state change signal (the change in value of the measured characteristic—such as signal amplitude) to the sources of error (e.g., background and instrumentation variation and noise) is referred to as the signal-to-background-variation-ratio. In these types of systems, the signal-to-background-variation-ratio can be extremely low.

As one example, assume that the mobile machine 102 is a cotton harvesting machine. Cotton picking efficiency has been estimated to be approximately 95-98% when machine and crop conditions are good. However, the natural variation in cotton harvested per foot of row length is often on the order of 100%. The peaks in that variation are often double the average, and the troughs are near zero. Thus, even if the instrumentation had perfect accuracy and precision, detecting changes in this noisy variable is very difficult.

This problem is exacerbated by the fact that the yield sensor in some implementations is a mass flow sensor. The mass flow sensor data for some sensors may have at least 3% error, even immediately after the sensor is calibrated. In some cotton harvesting equipment, the mass flow sensor data commonly shows a variation of 10% over a day of harvesting even when calibration guidelines are followed. The sensor data can vary on the order of 50% when calibration is not performed as recommended. These types of error numbers are determined by comparing the sum of the instruments flow numbers to the actual crop weighed on a lab-precision scale.

Figure 2:
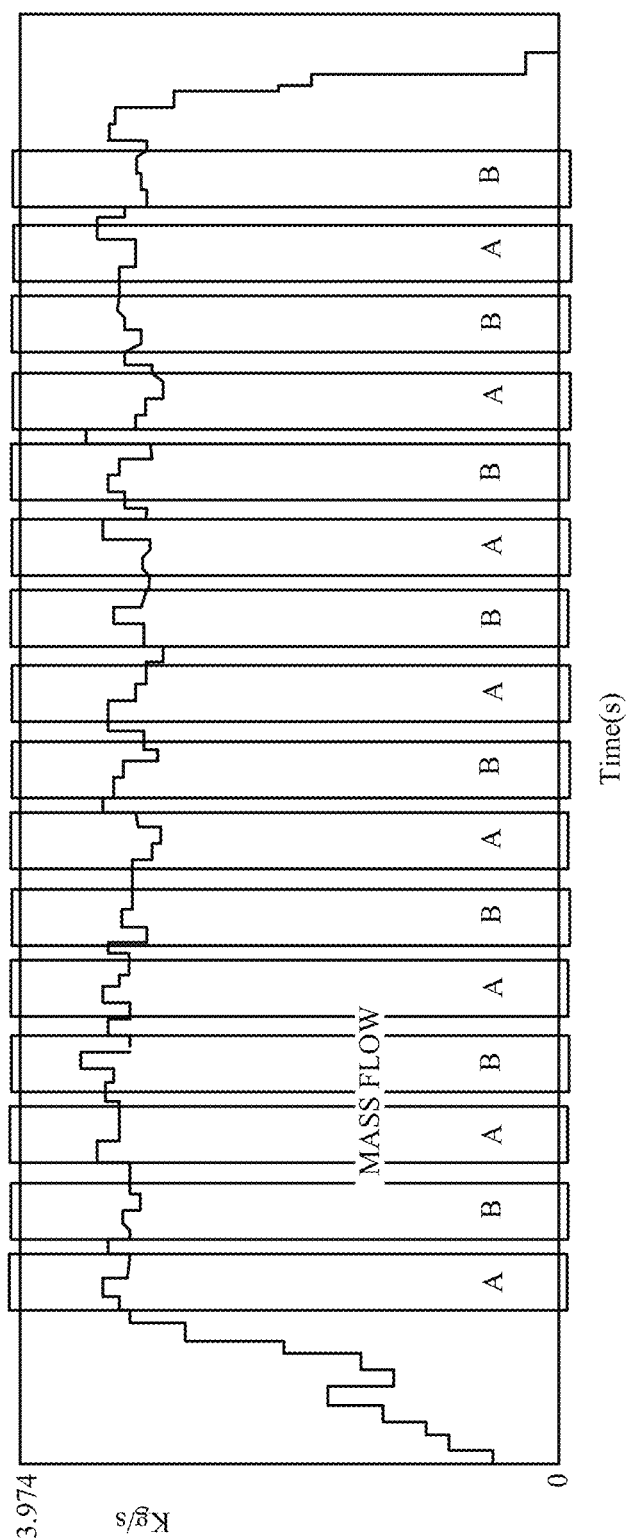
FIGS. 2 and 3 are graphs that illustrate that noise levels in evaluating enhancement criteria can be lowered with sufficient iterations.
Figure 3:
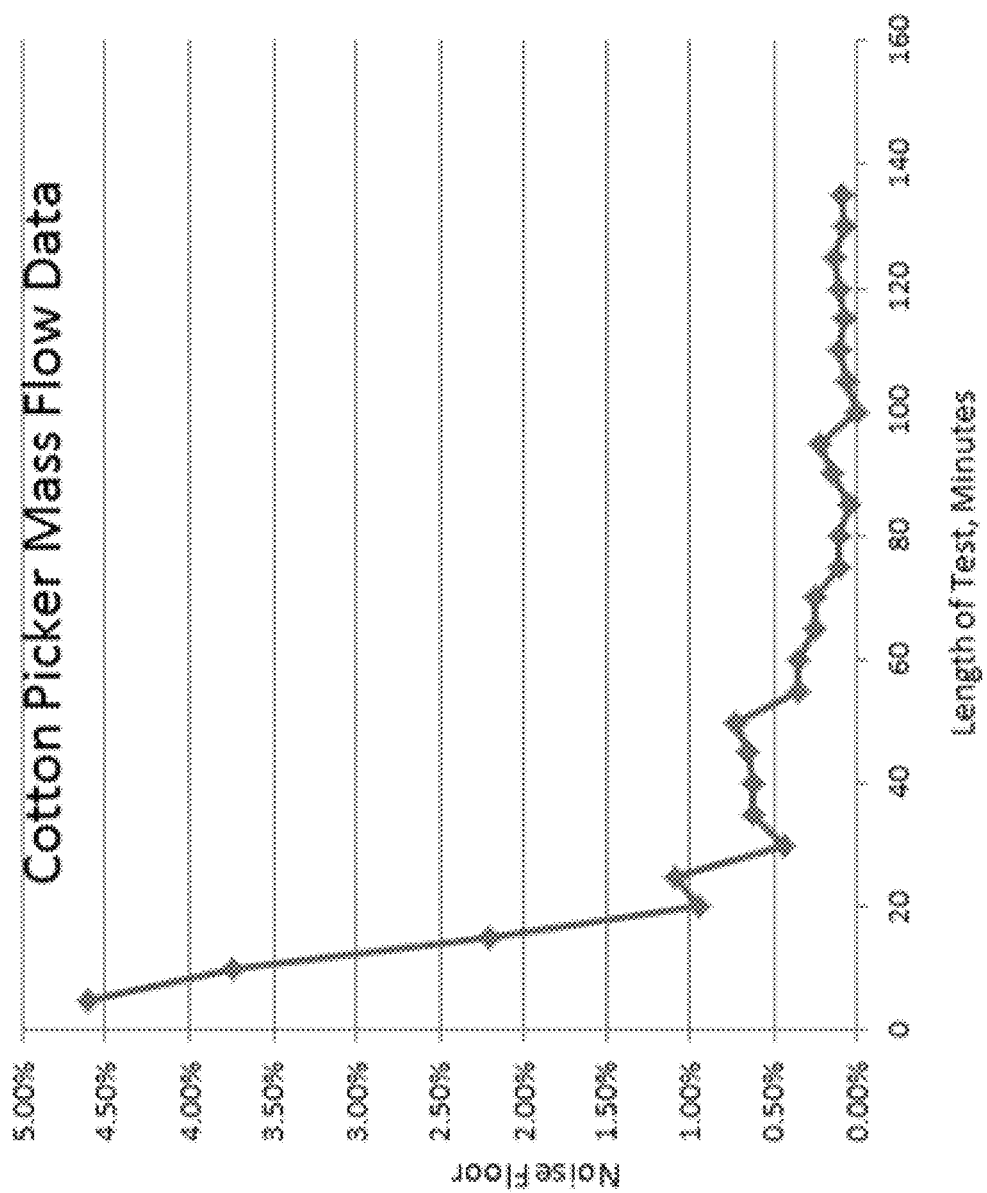

However, even given this type of crop variation and instrumentation inaccuracy, the background and instrumentation variation and noise can be driven down to very low levels as iteration logic 134 iterates between two different control configurations. FIGS. 2 and 3 illustrate this is more detail.

FIG. 2 is a graph of mass flow rate of cotton, sensed by a mass flow sensor in a cotton harvesting machine, plotted over time, for harvesting a single row of cotton. FIG. 2 also shows that the graph is divided between two different states, the first is referred to as state A and the second is referred to as state B. The graph reflects switching between states A and B every 10 seconds, with a 3 second transition time between the states. For purposes of FIG. 2, the control configuration used in the harvesting operation is not changed. The noise floor for the data can be identified by summing the data in all of the A segments and summing the data in all of the B segments and then dividing the sum of the A segment data by the sum of the B segment data. It has been found that, as the number of A and B segments increases, the ratio of the sum of the A segments over the sum of the B segments approaches one.

FIG. 3 is a graph of the noise floor calculated as the difference—in percent-between the sum of the A segments and the sum of B segments, plotted versus time, with switching occurring every 10 seconds, and with a 3 second transition time. The plot in FIG. 3 illustrates that the background and instrumentation variation and noise floor can be driven down to 0.2% for the cotton mass flow sensor data. Therefore, with error levels on the order of 0.2%, tiny changes in picking efficiency can be detected. For example, a change in picking efficiency on the order of 0.25% can be measured, even in the presence of variation of crop flow on the order of 50%, using existing sensor instrumentation on existing harvesters.

Harvesting machine 102 can thus use this detection by switching operation between two different control configurations (e.g., corresponding to two different sets of machine settings) in order to refine its settings, on the fly, to optimize its picking efficiency for current crop conditions. In addition, the variations in efficiency (or other criteria) corresponding to the two different control configurations can be stored and correlated to the different control configurations for later analysis and further optimization of the mobile machine design.

The iteration technique provides precise relative measurements that would normally be masked by background variability and noise. This enables operational enhancement (e.g., optimization) of substantially any software controlled variable. It operates with sensors that need not even be calibrated and it is not affected by sensor drift. It can be used in the presence of high crop variability and trends and it does not need post-harvest measurements of unharvested crop and the corresponding labor that is needed to make those measurements.

Figure 4:
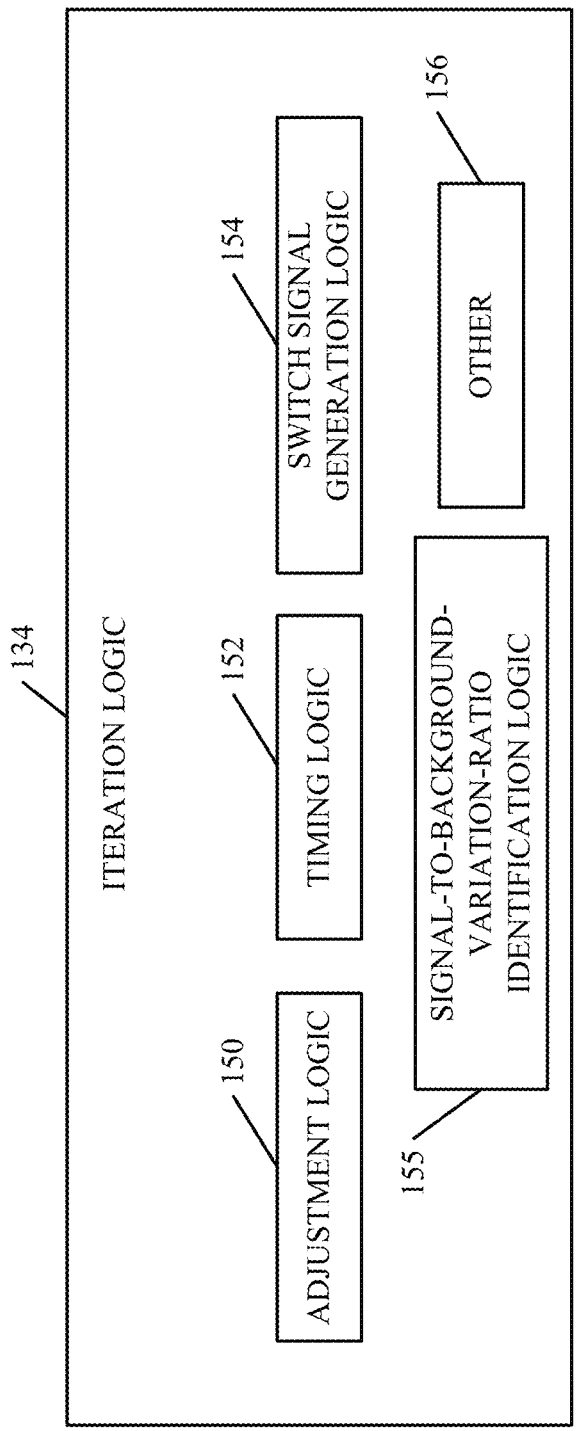
FIG. 4 is a block diagram showing one example of iteration logic.

FIG. 4 is a more detailed block diagram of one example of iteration logic 134. In the example shown in FIG. 4, logic 134 includes adjustment logic 150, timing logic 152, switch signal generation logic 154, signal-to-background-variation-ratio identification logic 155 and it can include other items 156. Adjustment logic 150 illustratively adjusts the control parameters or selects new control parameters with which control system 114 is to control the controllable systems 120. Switch signal generation logic 154 illustratively generates a switch signal to control system 114 indicating that control system 114 should now switch to the adjusted (or newly selected) control parameters or control algorithm identified by logic 150. Timing logic 152 illustratively includes timing components that indicate how long control system 114 should control the controllable systems 120 using the identified control parameters (or control algorithm) before switching to a different set of control parameters (or a different control algorithm). Timing logic 152 also illustratively includes a transition time element that keeps track of the time needed by control system 114 and controllable systems 120 to transition to the new control parameters (or control algorithm). The transition time illustratively gives machine 102 time to change the state of the control parameters or control algorithm and also for the crop to reach the mass flow sensor once the parameters or control algorithm have been changed. In a cotton harvesting machine, for instance, one example of a transition time may be on the order of 2-3 seconds, depending on the location of the mass flow sensor on the harvesting machine. This, of course, is an example only.

Figure 5A:
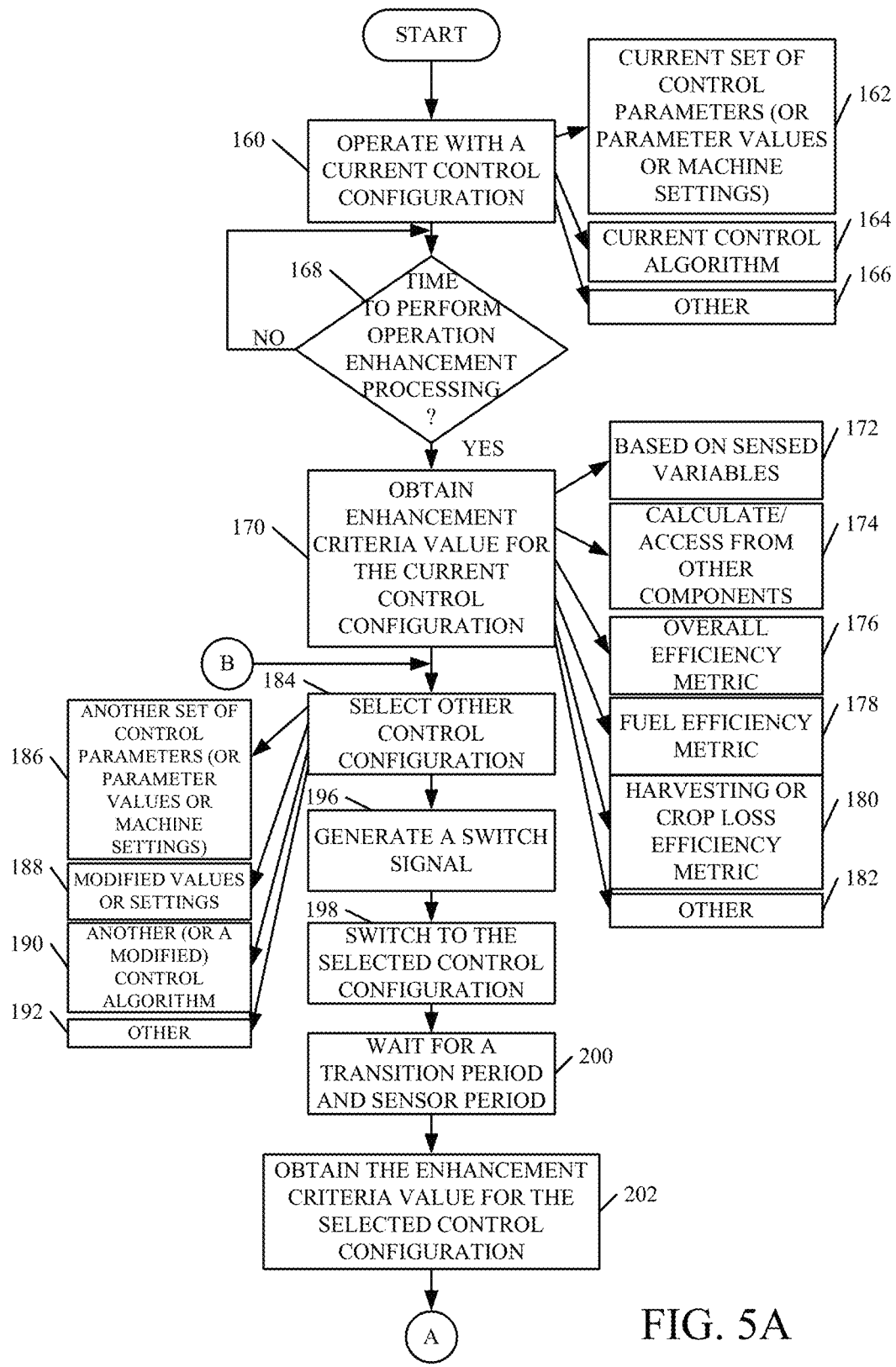
FIGS. 5A and 5B (collectively referred to herein as FIG. 5) show a flow diagram illustrating one example of an operation enhancement system on a mobile machine.
Figure 5B:
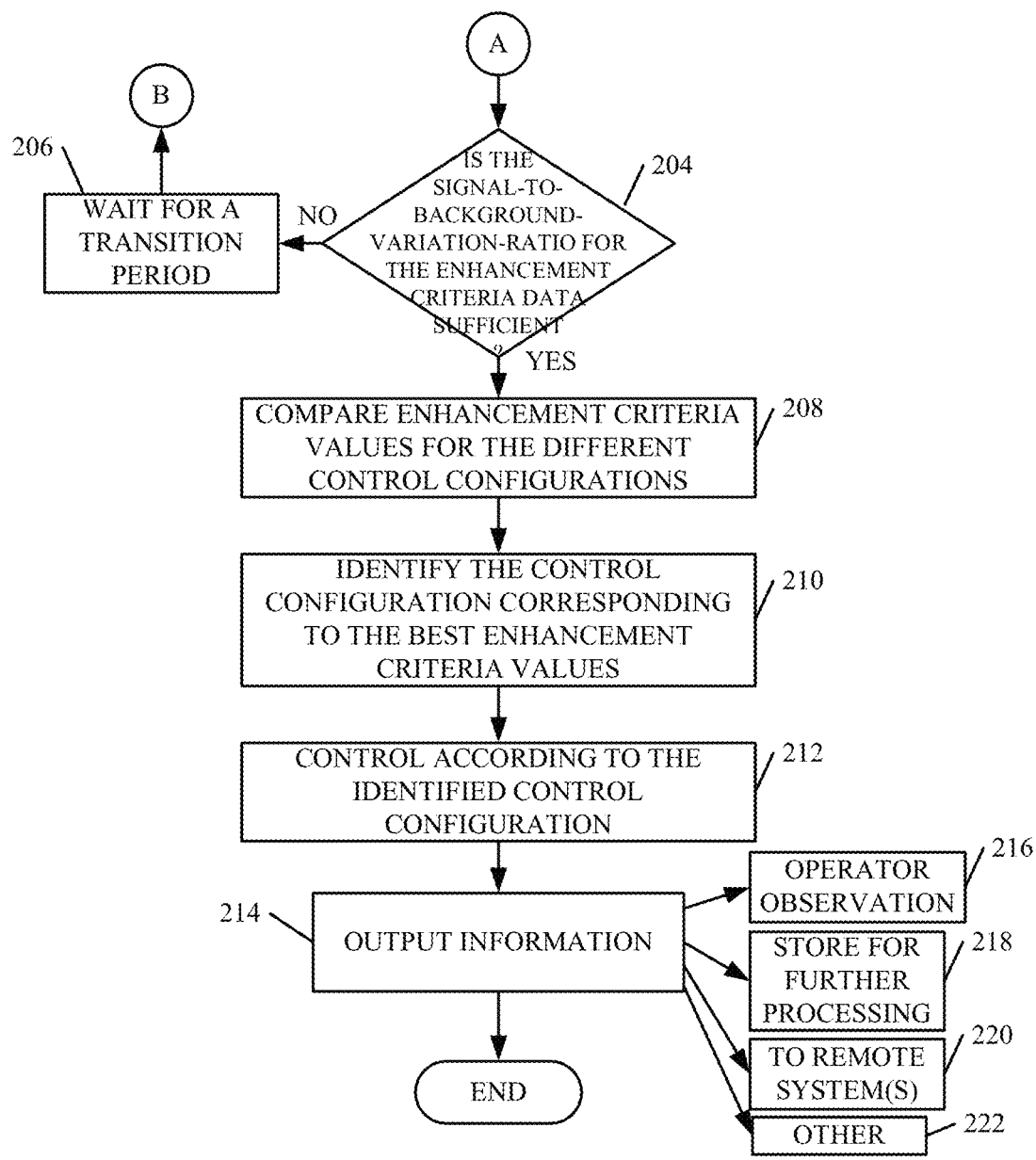

FIGS. 5A and 5B (collectively referred to herein as FIG. 5) show a flow diagram illustrating one example of the operation of operation enhancement system 132 in iterating between two control configurations (e.g., two sets of machine settings) a sufficient number of times until the signal-to-background-variation-ratio is at a desired level so that a decision as to which of the two control configurations is best can be made with a high degree of accuracy. It is first assumed that mobile machine 102 is operating such that control system 114 is controlling the controllable systems 120 using an initial (or current) control configuration. This is indicated by block 160 in FIG. 5. By way of example, the control configuration may be a current set of machine settings, control parameters or parameter values. This is indicated by block 162. The control configuration may be a current control algorithm. This is indicated by block 164. The control configuration may be a variety of other variable items that may be used by control system 114 in controlling the controllable systems 120. This is indicated by block 166.

Timing logic 152 then determines whether it is time for iteration logic 134 to perform operation enhancement processing. This is indicated by block 168. If not, machine 102 simply continues to operate using the current control configuration (i.e., the current set of control parameters or the current control algorithm, etc.). However, if, at block 168, it is determined that it is time to perform operation enhancement processing, then criteria evaluation logic 136 in operation enhancement system 132 evaluates the enhancement criteria for the current control configuration. This is indicated by block 170. Again, as briefly discussed above, the enhancement criteria may be one of the sensor signal values generated by sensors 108-110, or it might be based upon the values of the sensed variables. This is indicated by block 172. The evaluation logic can calculate the enhancement criteria or access the value of the enhancement criteria, which may be calculated by another system or component. This is indicated by block 174. The enhancement criteria can take a wide variety of different forms. For instance, it may be an overall efficiency metric as indicated by block 176. It may be a more specific metric, such as a fuel efficiency metric 178, or a harvesting or crop loss efficiency metric 180. Of course, it can be a wide variety of other enhancement criteria as well, and this is indicated by block 182.

Once the enhancement criteria have been evaluated for the current control configuration, then adjustment logic 150 selects another control configuration that is to be used by control system 114 to control controllable systems 120. This is indicated by block 184. The other control configuration can be another set of control parameters (such as a different set of parameter values or a different set of machine settings). This is indicated by block 186. The new control configuration can also include modified parameter values or settings that are based on the current set of parameter values, but are modified by adjustment logic 150, in an effort to improve the enhancement criteria. This is indicated by block 188. In addition, the other control configuration can be another (or a modified) control algorithm. This is indicated by block 190. The newly selected control configuration can be a wide variety of other control configurations as well, and this is indicated by block 192.

Once the new control configuration has been selected, then switch signal generation logic 154 generates a switch signal and provides it to control system 114. This is indicated by block 196. In response control system 114 switches to the selected control configuration and begins controlling the controllable systems 120, based upon that control configuration. This is indicated by block 198.

Timing logic 152 then causes criteria evaluation logic 136 to wait for a given transition time, and a given sensor period. This is indicated by block 200. For instance, in the example shown above with respect to FIGS. 2 and 3, the transition time is 3 seconds and the sensor period is 10 seconds.

Criteria evaluation logic 136 then evaluates the enhancement criteria value for the selected control configuration. This is indicated by block 202.

Signal-to-background-variation-ratio identification logic 155 then determines whether the signal-to-background-variation-ratio for the enhancement criteria data is sufficient or whether further iterations need to be performed in order to obtain a desired signal-to-background-variation-ratio for that data. This is indicated by block 204. If the signal-to-background-variation-ratio is not sufficient. that means that further iterations are performed in order to drive the signal-to-background-variation-ratio for the enhancement criteria data higher. Therefore, criteria evaluation logic 136 stores the enhancement criteria value information, for the present iteration, in data store 124 (or elsewhere). This is indicated by block 206.

In order to determine whether the signal-to-background-variation-ratio is sufficient, logic 155 can do a number of different things. For instance, it may be that the number of iterations needed to obtain the desired signal-to-background-variation-ratio for the present enhancement criteria, using the present mobile machine 102, under the present conditions, has been precomputed. In that case, signal-to-background-variation-ratio identification logic 155 obtains one or more sensor signals indicative of the present conditions, and a machine identifier signal indicative of an identification of the present machine 102, and then obtains the precomputed iteration value from a data store (such as data store 124) where those values can be indexed based upon conditions and machine identification. In another example, signal-to-background-variation-ratio identification logic 155 can dynamically calculate the number of iterations (or length of time) to get an adequate signal-to-background-variation-ratio, based upon the current number of iterations that have been performed, the current crop conditions (or other operating conditions), and/or based on a wide variety of other criteria.

When the signal-to-background-variation-ratio is insufficient, processing reverts to block 184, where the other control configuration is selected and control system 114 is switched back to that previous control configuration to begin controlling controllable systems 120 based upon that control configuration.

When, at block 204, logic 155 determines that the signal-to-background-variation-ratio is sufficient to make an evaluation of the enhancement criteria, then criteria comparison logic 138 compares the enhancement criteria values for the different control configurations through which system 132 just iterated. This is indicated by block 208. For instance, it compares the enhancement criteria values calculated for the iterations when the first control configuration was used, to the enhancement criteria values calculated when the second control configuration was used. It identifies the particular control configuration corresponding to the best enhancement criteria values. This is indicated by block 210.

Once the better performing control configuration has been identified, then a number of things can happen. In one example, this is provided to control system 114 and control system 114 begins controlling controllable systems 120 according to the identified, best performing, control configuration. This is indicated by block 212. For instance, if the best performing control configuration corresponds to a particular set of machine settings, the control system 114 begins controlling systems 120 using those settings. If the best performing control configuration corresponds to a particular control algorithm, then control system 114 begins using that algorithm. In addition, criteria comparison logic 138 can output the identified, best performing, control configuration in other ways as well. This is indicated by block 214. For instance, it can be output on a user interface mechanism 130, for user observation. This is indicated by block 216. It can be stored (such as on data store 124 or another data store) for further processing by other systems. This is indicated by block 218. It can be sent through communication system 126 to one or more different remote systems 106, as well. This is indicated by block 220. By way of example, it may be that a remote system 106 is a design system that is used to optimize, or enhance, the design of mobile machine 102 or certain systems or subsystems of that machine. The information indicative of the better performing control configuration can be used in future design work. Further, the information regarding the better performing control configuration can be correlated to the machine configuration, to crop conditions or other operating conditions, or to a wide variety of other information in order to improve the performance of machine 102 in the future. Thus, it can be seen that in addition to using the better performing control configuration in real time, during runtime of machine 102, it can be used in a wide variety of other ways as well. This is indicated by block 222.

Figure 6:
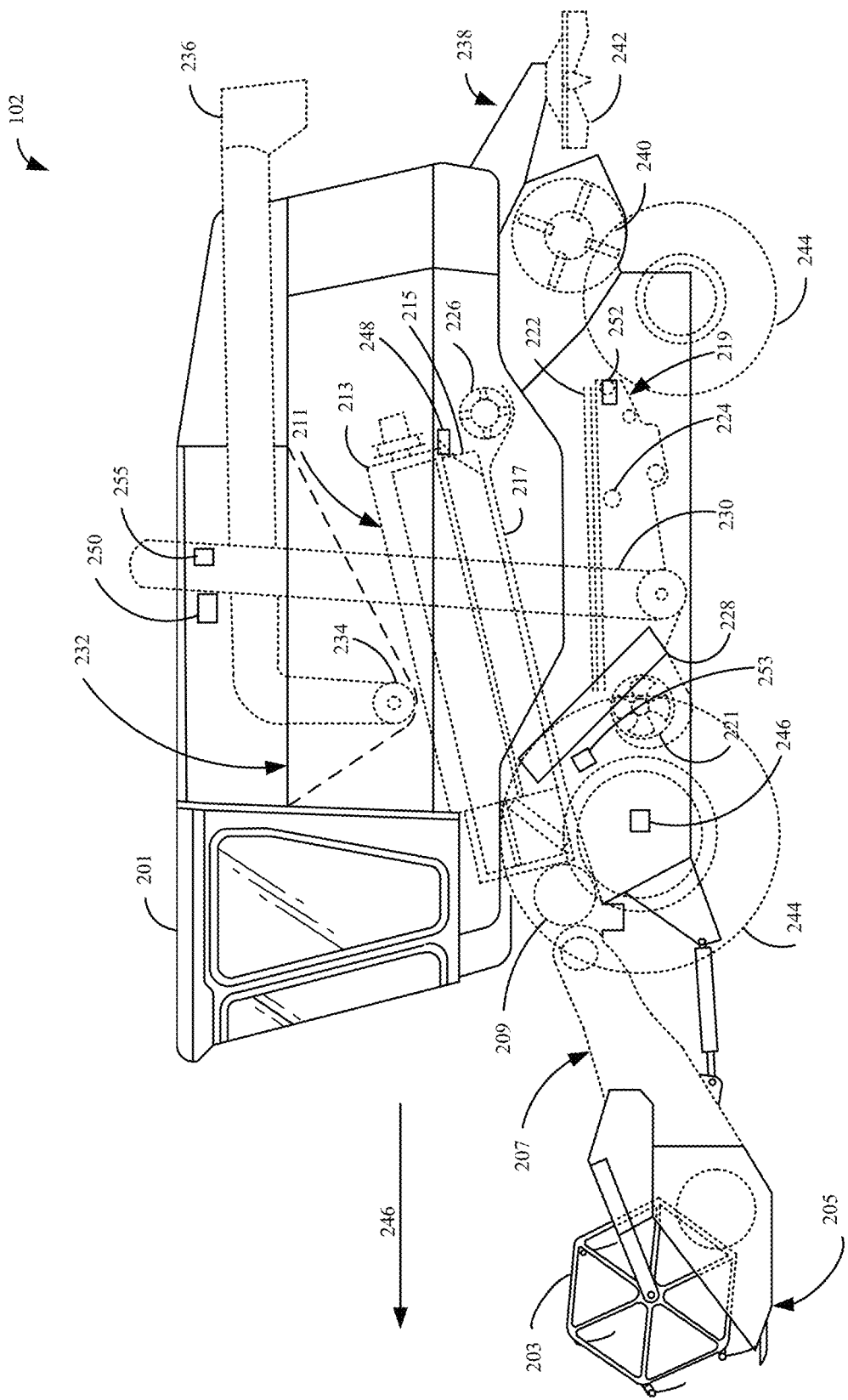
FIG. 6 is a partial schematic, partial pictorial illustration of an example in which the mobile machine is a combine harvester.

FIG. 6 shows one example in which mobile machine 102 is a combine harvester. The general description of one example of a combine harvester will be provided for the sake of example. FIG. 6 is a partial pictorial, partial schematic illustration of an agricultural harvesting machine or combine 102. It can be seen in FIG. 6 that combine 102 illustratively includes an operator compartment 201, and a front end subsystem including a set of front end equipment that can include header 203 and a cutter generally indicated at 205. Header 203 and cutter 205 are configured based on the type of crop to be harvested.

Combine 102 also includes a material handling or feed subsystem configured to convey or feed the cut crop into and through at least a portion of combine 102. The feed subsystem includes a conveyance assembly, such as feederhouse 207, that conveys the crop from the front end equipment into combine 102. The feed subsystem also includes a rotating feed mechanism that receives the crop from feederhouse 207. In the illustrated example, the rotating feed mechanism comprises a feed accelerator 209 configured to accelerate the crop fed toward or into a subsequent threshing stage (e.g., a rotating threshing drum or cylinder). However, it is noted that in another example in which a feed accelerator is not utilized, the threshing stage can be disposed to receive the crop from feederhouse 207. In one example, the axis of the threshing drum is oriented perpendicular to the crop flow from feederhouse 207. In another example, the axis of the threshing drum is substantially aligned with the crop flow.

In the example of FIG. 6, a thresher 211 illustratively includes a threshing rotor 213 and a set of concaves 215. Further, combine 102 can include a separator 217 that includes a separator rotor. Combine 102 can include a cleaning subsystem (or cleaning shoe) 219 that, itself, can include a cleaning fan 221, chaffer 222 and sieve 224. The material handling or feed subsystem can include (in addition to a feederhouse 207 and feed accelerator 209) discharge beater 226, tailings elevator 228, clean grain elevator 230 (that moves clean grain into clean grain tank 232) as well as unloading auger 234 and spout 236. Combine 102 can further include a residue subsystem 238 that can include chopper 240 and spreader 242. Combine 102 can also have a propulsion subsystem 243 that includes ground engaging wheels 244 or tracks, etc. that are driven by a drive train. It will be noted that combine 102 may also have more than one of any of the subsystems mentioned above (such as left and right cleaning shoes, separators, etc.).

In operation, and by way of overview, combine 102 illustratively moves through a field in the direction indicated by arrow 246. As it moves, header 203 engages the crop to be harvested and gathers it toward cutter 205. After it is cut, it is moved by a conveyor in feederhouse 207 toward feed accelerator 209, which accelerates the crop into thresher 211. The crop is threshed by rotor 213 rotating the crop against concave 215. The threshed crop is moved by a separator rotor in separator 217 where some of the residue is moved by discharge beater 226 toward the residue subsystem 238. It can be chopped by residue chopper 240 and spread on the field by spreader 242. In other implementations, the residue is simply dropped in a windrow, instead of being chopped and spread.

Grain falls to cleaning shoe (or cleaning subsystem) 219. Chaffer 222 separates some of the larger material from the grain, and sieve 224 separates some of the finer material from the clean grain. Clean grain falls to an auger in clean grain elevator 230, which moves the clean grain upward and deposits it in clean grain tank 232. Residue can be removed from the cleaning shoe 219 by airflow generated by cleaning fan 221. That residue can also be moved rearwardly in combine 102 toward the residue subsystem 238.

Tailings can be moved by tailings elevator 228 back to thresher 210 where they can be re-threshed. Alternatively, the tailings can also be passed to a separate re-threshing mechanism (also using a tailings elevator or another transport mechanism) where they can be re-threshed as well.

FIG. 6 also shows, in one example, that combine 102 can include ground speed sensor 246, one or more separator loss sensors 248, a clean grain camera 250, a tailings camera 253, one or more cleaning shoe loss sensors 252 and a mass flow sensor 255 that senses mass flow of grain through clean grain elevator 230 and flowing into clean grain tank 232. Ground speed sensor 224 illustratively senses the travel speed of combine 102 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 252 illustratively provide an output signal indicative of the quantity of grain loss by both the right and left sides of the cleaning shoe. In one example, sensors 252 are strike sensors which count grain strikes per unit of time (or per distance traveled) to provide an indication of the cleaning shoe grain loss. The strike sensors for the right and left sides of the cleaning shoe can provide individual signals, or a combined or aggregate signal. It will be noted that sensors 252 can comprise only a single sensor as well, instead of separate sensors for each shoe.

Separator loss sensors 248 provide a signal indicative of grain loss in the left and right separators 211. The sensors associated with the left and right separators 211 can provide separate grain loss signals, or a combined or aggregate signal. This can be done using a wide variety of different types of sensors as well. It will be noted that separator loss sensors 248 may also comprise only a signal sensor, instead of separate left and right sensors.

It will also be appreciated that other sensors can be used as well. For instance, a machine state sensor may be configured to sense whether machine 102 is configured to chop the residue, or drop a windrow. A cleaning shoe fan speed sensor can be configured proximate cleaning shoes 222 to sense the speed of the fan 221. A material other than grain (MOG) moisture sensor can be configured to sense the moisture level of the material other than grain that is passing through machine 102. A machine setting sensor can include one or more sensors that are configured to sense the various configurable settings on machine 102. A machine orientation sensor can include a wide variety of different types of sensors that can sense the orientation of machine 102. Crop property sensors can be sensors that are configured to sense a wide variety of different types of crop properties, such as crop type, and other crop properties.

The crop property sensors may also be configured to sense crop characteristics as the crop is processed by machine 102. Mass flow sensor 255 can include a grain feed rate sensor. In one example, this is a sensor deployed in elevator 230 that senses mass flow through elevator 230 and that provides an output signal indicative of this. The mass flow rate may be used to represent mass flow and yield in bushels per hour, tons per hectare, tons per hour or in other units.

Therefore, in the example in which mobile machine 102 is a combine, operation enhancement system 132 can be used to control a wide variety of different types of variables. For instance, it can determine a better performing rotor speed of rotor 213. It can determine a better performing concave position of the concaves 213. It can be used to identify a better performing fan speed of fan 221. It can be used to identify a better performing header height (or header height control parameters) for header 203. The enhancement criteria that are evaluated to determine which set of parameters is better performing may be harvesting efficiency, crop loss, fuel efficiency, among a wide variety of other criteria. It can be used to determine better performing sieve and chaffer settings, or ground speed. It can be used to identify other machine settings combinations of settings, or other controllable values as well.

The sensors that may be used include mass flow sensors in the clean grain elevator, such as sensor 250. They can be grain loss sensed by the various grain loss sensors, or grain quality, sensed by the grain quality sensors (e.g., the cameras). The sensors can include fuel flow sensors that sense fuel flow or a wide variety of other sensors or combinations of sensors, some of which are described above with respect to FIG. 6.

In another example, mobile machine 102 may be a cotton harvester. The cotton harvester may be a cotton picker or a cotton stripper, as examples. The spindles are mounted on a rotating drum. In one example, the movement of the picking unit can be synchronized with the travel speed or ground speed of the cotton harvester. This results in less damage to the cotton stalks which improves the quality of the harvested cotton as well as power efficiency, and it reduces wear on the row units of the harvester.

A cotton picker uses rows of barbed spindles that rotate and remove seed-cotton from the cotton plant. A set of counter-rotating doffers then remove the seed-cotton from the spindles and a blower blows the cotton into a basket. When the basket is full, the cotton picker transmits the seed-cotton into a module builder. In some examples, the module builder is a separate machine, while in others, it is incorporated or integrated into the cotton picker, itself. The module builder builds a compact module of un-ginned cotton which can be stored in the field or elsewhere until it is ginned.

A cotton stripper removes not only the lint from the cotton plant, but some of the plant matter as well. For instance, it can remove unopened bolls, along with the lint. In order to remove the plant matter from the lint, the heavier matter is dropped from the material processing flow, before the lint arrives at the basket in the picker. Again, the basket can be emptied into either a separate module builder or an on-board-module builder, or the cotton can be formed into modules or bales in other ways as well.

The spindles are mounted on a rotating drum. Cotton yield in either a picker or stripper can be measured by a mass flow sensor that senses the mass flow of cotton through one or more of the various ducts in the processing subsystems of the cotton harvester. Thus, in one example, the different control configurations that may be iterated on by iteration logic 134 may include different picking unit drum speeds, different picking unit spindle speeds, different picking unit synchronization timing, and different vehicle speeds, among others.

It should also be noted that other approaches can be used as well, instead of switching control configurations. Rather, the machine may have different picking units set to the different configurations. This would result in multiple different configuration channels that can be sensed, simultaneously, and compared. For instance, where the machine is a harvester with multiple picking units and separate control channels for those picking units, mass flow can be sensed from one set of picking units (e.g., picking units 1, 3, and 5) and compared with the mass flow from a second set of picking units (e.g., picking units 2, 4 and 6). To do this, a pre-calibration can be performed to obtain a normalization multiplier so the mass flows from all of the individual sensors is comparable. The calibration step can be repeated as well.

There are also other variants that are contemplated herein. For instance, instead of switching all picking units between the multiple different control configurations. This may be done for only a single picking unit, leaving the other picking units unchanged until a better control configuration is identified, at which point all picking units are switched to the identified control configuration.

Similarly, two picking units may be used to check two different control configurations, simultaneously. For instance, some of the picking units may be set to a default control configuration, and then one of them may be set to a second control configuration and another picking unit may be set to a third control configuration. The mass flows (or other characteristic) may then be sensed for all three control configurations at substantially the same time, and the best of the three can be identified. Further, one of the control configurations may deviate from the default control configuration in a first direction, while the other deviates from the default control configuration in the opposite direction.

All of these and other, approaches are contemplated herein. Those described are discussed for the sake of example only.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well. The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that control configuration information, or other information, can be output to the cloud.

Figure 7:
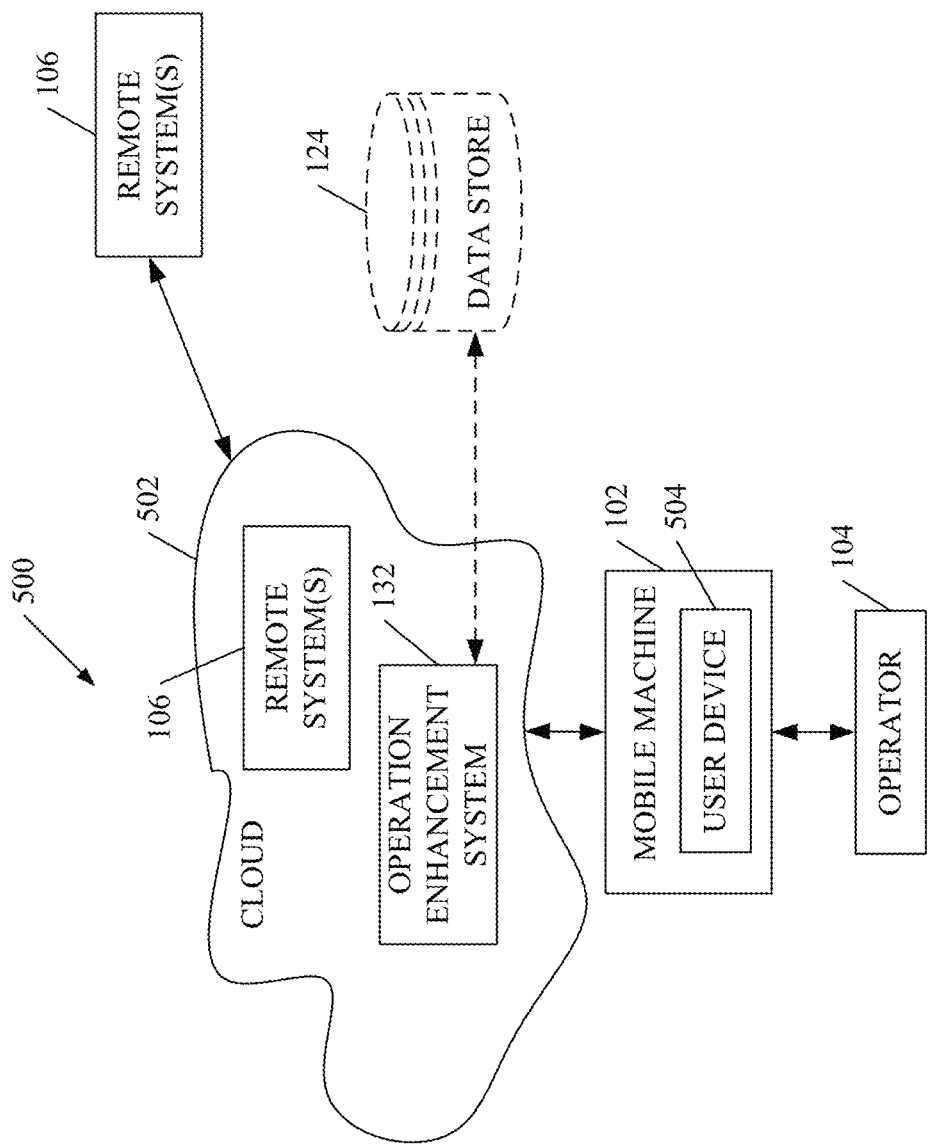
FIG. 7 is a block diagram illustrating one example of the mobile machine discussed above in a remote server environment.

FIG. 7 is a block diagram of architecture 100, shown in FIG. 1, except that it is disposed in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 1 and they are similarly numbered. FIG. 7 specifically shows that operation enhancement system 132, remote system(s) 106, and data store 124 can be located at a remote server location 502. Therefore, harvester 100 accesses those systems through remote server environment 502.

FIG. 7 also depicts another example of a remote server architecture. FIG. 7 shows that it is also contemplated that some elements of FIG. 1 are disposed at remote server location 502 while others are not. By way of example, data store 124 or remote system(s) 106 can be disposed at a location separate from location 502, and accessed through the remote server at location 502. Regardless of where they are located, they can be accessed directly by harvester 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
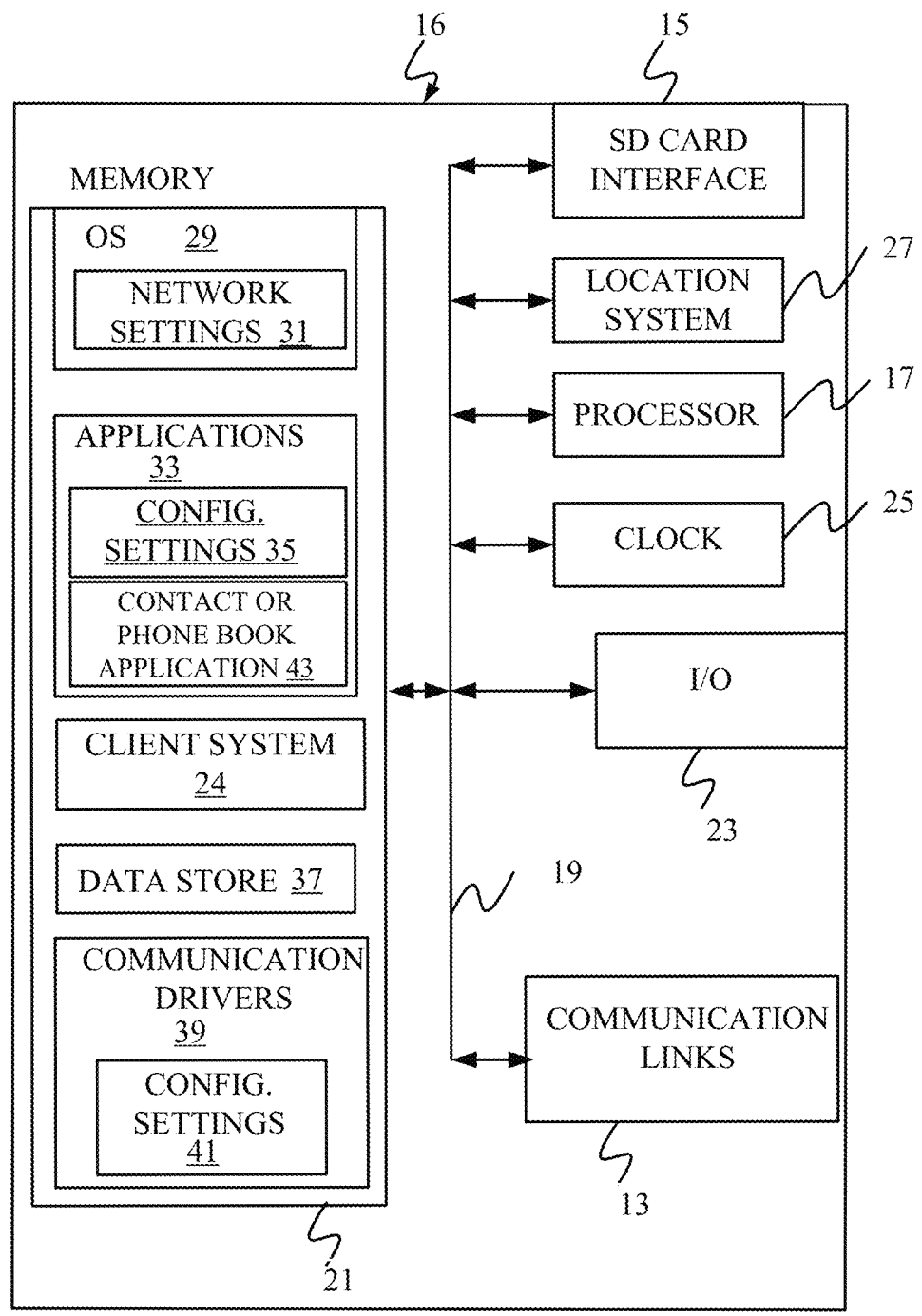
FIGS. 8-10 show examples of mobile devices that can be used in the architectures shown in previous Figures.
Figure 9:
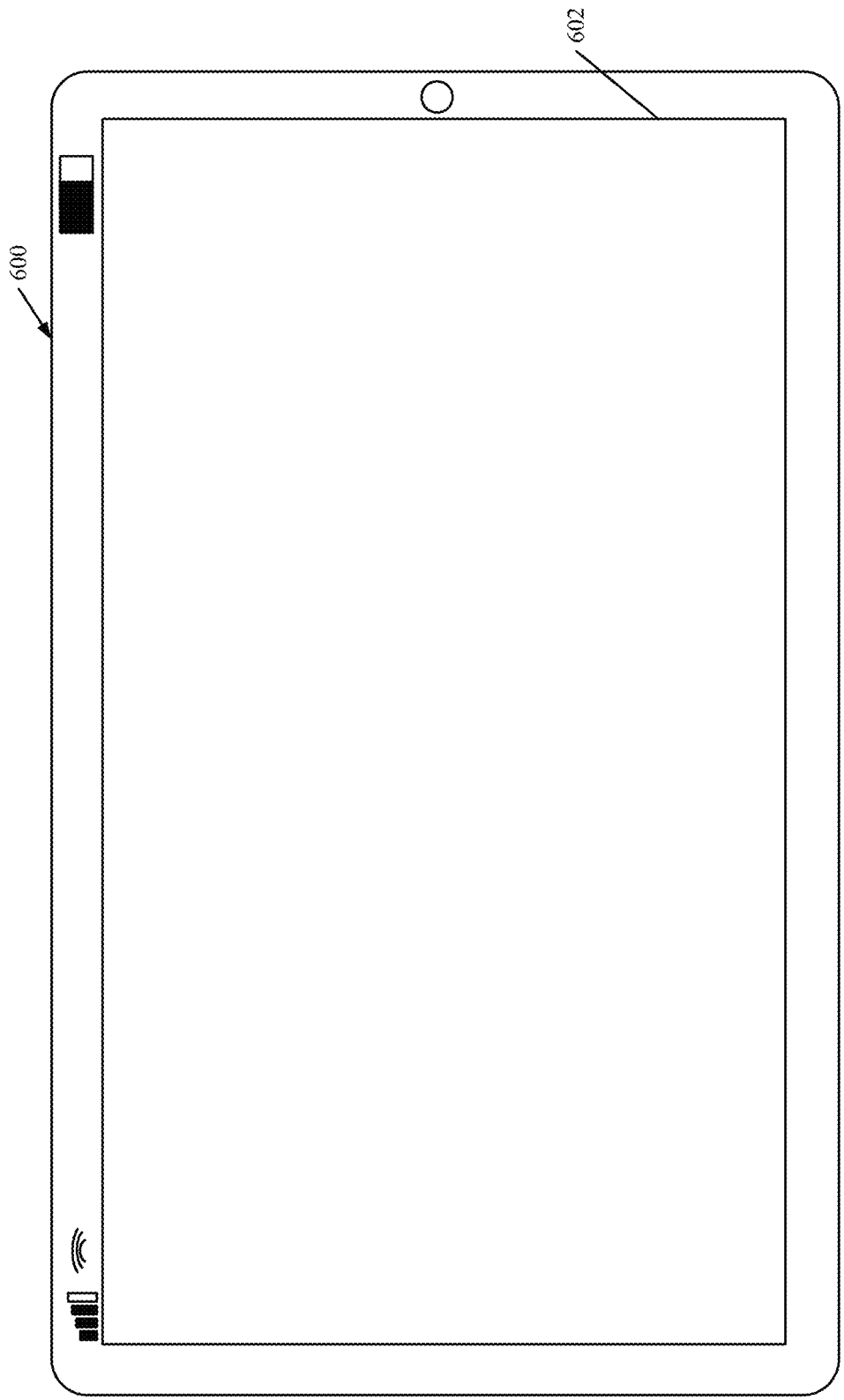

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the performance data. FIGS. 8-9 are examples of handheld or mobile devices.

FIG. 8 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can be one of the processors mentioned above) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 10:
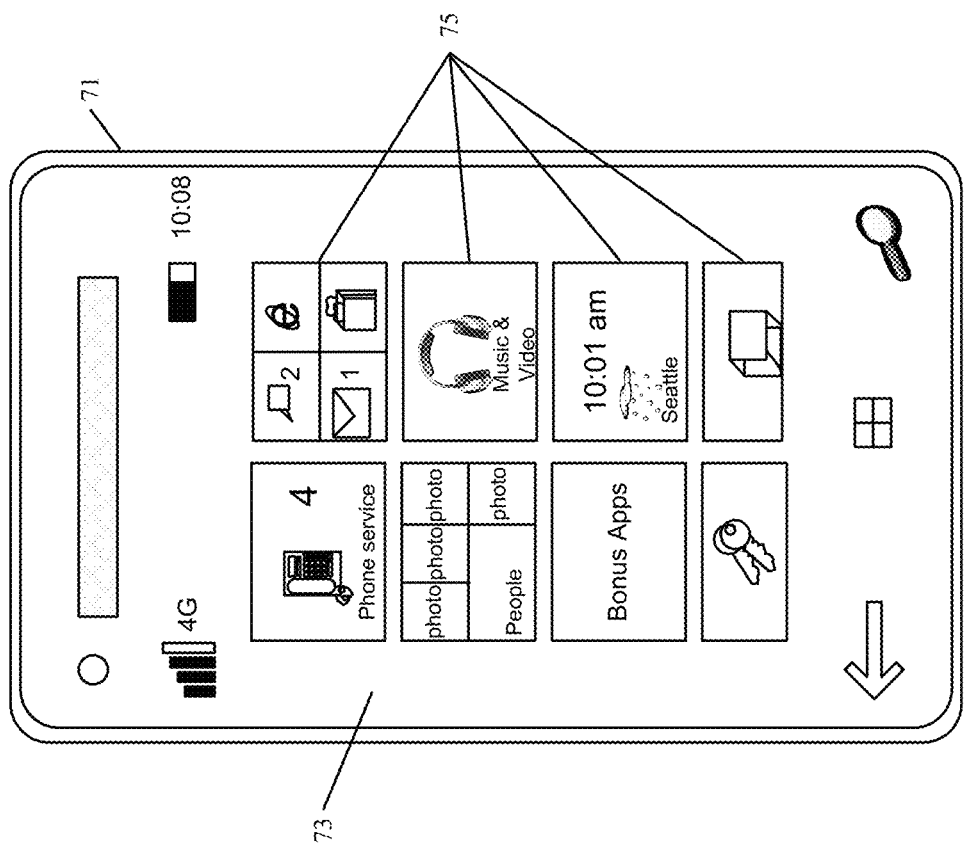

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
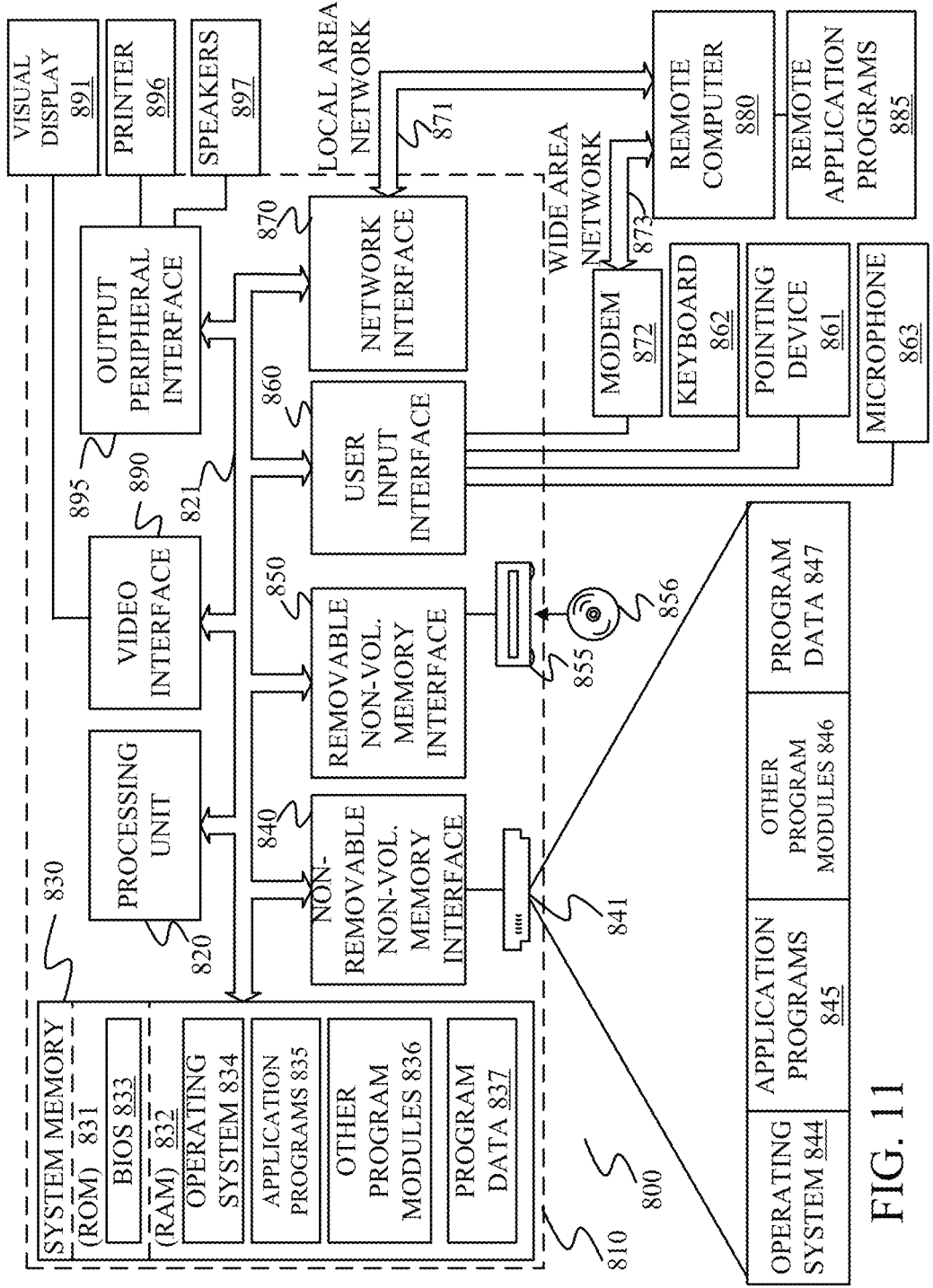
FIG. 11 is a block diagram of one example of a computing environment that can be used in any of the architectures shown in the previous figures.

FIG. 11 is one example of a computing environment in which elements of FIG. 1, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise any of the processor or sensors from previous Figure), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile machine, comprising:
a controllable system that performs a machine function;
a control system that controls the controllable system based on a selected control configuration;
an operation enhancement system that receives sensor signal values from a set of sensors, each of the sensor signal values being indicative of a sensed variable, the operation enhancement system generating enhancement criteria values based on the sensor signal values generated during machine operation in the selected control configuration, and intermittently switching between selecting at least a first control configuration and a second control configuration as the selected control configuration; and
signal-to-background-variation-ratio (SBVR) identification logic that controls the operation enhancement system to continue intermittently switching between selecting at least the first control configuration and the second control configuration as the selected control configuration until a signal-to-background-variation-ratio corresponding to the sensor signal values reaches a given level.

Example 2 is the mobile machine of any or all previous examples wherein the operation enhancement system comprises:
criteria comparison logic that compares the enhancement criteria values generated based on operation in the first control configuration to enhancement criteria values generated based on operation in the second control configuration, in response to the SBVR identification logic identifying that the signal-to-background-variation-ratio has reached the given level, to identify a better performing control configuration.

Example 3 is the mobile machine of any or all previous examples wherein the operation enhancement system outputs the better performing control configuration to the control system as the selected control configuration.

Example 4 is the mobile machine of any or all previous examples wherein the operation enhancement system includes iteration logic that intermittently selects at least the first control configuration and the second control configuration and generates a switch signal, the control system switching to control the controllable system with the selected control configuration based on the switch signal.

Example 5 is the mobile machine of any or all previous examples wherein the iteration logic comprises:
timing logic that identifies a time to generate the switch signal and a transition time for the control system to switch to the selected control configuration and for the switch to the selected control configuration to be reflected in the sensor signals.

Example 6 is the mobile machine of any or all previous examples wherein the first and second control configurations each correspond to a different set of machine settings.

Example 7 is the mobile machine of any or all previous examples wherein the first and second control configurations each correspond to a different control algorithm used by the control system.

Example 8 is the mobile machine of any or all previous examples wherein the SBVR logic dynamically calculates the given level for the signal-to-background-variation-ratio.

Example 9 is the mobile machine of any or all previous examples wherein the given level for the signal-to-background-variation-ratio is predetermined and wherein the SBVR logic identifies the predetermined signal-to-error level based on a set of SBVR identification criteria.

Example 10 is the mobile machine of any or all previous examples and further comprising:
a user interface mechanism, the operation enhancement system outputting an indication of the better performing control configuration to the user interface mechanism.

Example 11 is the mobile machine of any or all previous examples wherein the controllable system comprises:
a controllable subsystem of a harvester that comprises one of a combine harvester, a cotton harvester, or a sugar cane harvester.

Example 12 is the mobile machine of any or all previous examples wherein the operation enhancement system generates harvesting efficiency values indicative of a harvesting efficiency of the harvester, as the enhancement criteria values, and wherein the criteria comparison logic compares the harvesting efficiency values generated based on operation of the harvester in the first control configuration to the harvesting efficiency values generated based on operation of the harvester in the second control configuration, in response to the SBVR identification logic identifying that the signal-to-background-variation-ratio has reached the given level, to identify a better performing harvester control configuration.

Example 13 is a method of operating a machine, comprising:
controlling a controllable system of the machine based on a selected control configuration;
generating a sensor signal value indicative of a sensed variable;
generating enhancement criteria values based on the sensor signal value generated during machine operation in the selected control configuration; and
iteratively switching between selecting at least a first control configuration and a second control configuration as the selected control configuration for controlling the controllable system until a signal-to-background-variation-ratio corresponding to the sensor signal value reaches a given level.

Example 14 is the method of any or all previous examples and further comprising:
comparing the enhancement criteria values generated based on operation in the first control configuration to enhancement criteria values generated based on operation in the second control configuration, to identify a better performing control configuration, in response to identifying that the signal-to-background-variation-ratio has reached the given level.

Example 15 is the method of any or all previous examples wherein generating enhancement criteria values comprises:
generating the enhancement criteria values based on the sensor signal value, after a transition time during which the control system switches to the selected control configuration and the switch to the selected control configuration is reflected in the sensor signal.

Example 16 is the method of any or all previous examples wherein the controllable system comprises a controllable subsystem of an agricultural harvester and wherein generating enhancement criteria values comprises:
generating harvesting efficiency values indicative of a harvesting efficiency of the agricultural harvester.

Example 17 is the method of any or all previous examples wherein comparing the enhancement criteria values comprises:
comparing the harvesting efficiency values generated based on operation of the agricultural harvester in the first control configuration to the harvesting efficiency values generated based on operation of the agricultural harvester in the second control configuration, in response to identifying that the signal-to-background-variation-ratio has reached the given level; and
identifying a better performing agricultural harvester control configuration based on the comparison.

Example 18 is an agricultural harvester, comprising:
a controllable harvesting subsystem that performs a harvesting function;
a control system that intermittently switches between controlling the controllable harvesting subsystem using a first control configuration and a second control configuration;
a yield sensor that generates a yield signal having a yield signal value indicative of a crop yield;
a harvesting efficiency calculator that calculates a first set of harvester efficiency metrics, based on the yield signal value and indicative of a harvesting efficiency of the agricultural harvester when the controllable harvester subsystem is controlled based on the first control configuration, and that calculates a second set of harvester efficiency metrics, based on the yield signal value and indicative of a harvesting efficiency of the agricultural harvester when the controllable harvester subsystem is controlled based on the second control configuration; and signal-to-background-variation-ratio (SBVR) identification logic that controls the control system to continue intermittently switching between controlling the controllable harvesting subsystem using the first control configuration and the second control configuration until a signal-to-background-variation-ratio corresponding to the yield signal value reaches a given level.

Example 19 is the agricultural harvester of any or all previous examples and further comprising:
criteria comparison logic that compares the first set of harvester efficiency metrics with the second set of harvester efficiency metrics, in response to the SBVR identification logic identifying that the signal-to-background-variation-ratio has reached the given level, to identify a better performing control configuration.

Example 20 is the agricultural harvester of any or all previous examples wherein the criteria comparison logic outputs an indication of the better performing control configuration to the control system, the control system controlling the controllable harvesting subsystem using the better performing control configuration based on the indication of the better performing control configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A mobile machine, comprising:
a controllable system that performs a machine function;
a control system that controls the controllable system based on a selected control configuration;
an operation enhancement system that receives sensor signal values from a set of sensors, each of the sensor signal values being indicative of a sensed variable, the operation enhancement system generating enhancement criteria values based on the sensor signal values generated during machine operation in the selected control configuration, and intermittently switching between selecting at least a first control configuration and a second control configuration as the selected control configuration; and
signal-to-background-variation-ratio (SBVR) identification logic that controls the operation enhancement system to continue intermittently switching between selecting at least the first control configuration and the second control configuration as the selected control configuration until a signal-to-background-variation-ratio corresponding to the sensor signal values reaches a given level, wherein the operation enhancement system comprises criteria comparison logic that compares the enhancement criteria values generated based on operation in the first control configuration to enhancement criteria values generated based on operation in the second control configuration, in response to the SBVR identification logic identifying that the signal-to-background-variation-ratio has reached the given level, to identify a better performing control configuration.

2. The mobile machine of claim 1 wherein the operation enhancement system outputs the better performing control configuration to the control system as the selected control configuration.

3. The mobile machine of claim 1 wherein the operation enhancement system includes iteration logic that intermittently selects at least the first control configuration and the second control configuration and generates a switch signal, the control system switching to control the controllable system with the selected control configuration based on the switch signal.

4. The mobile machine of claim 3 wherein the iteration logic comprises:
timing logic that identifies a time to generate the switch signal and a transition time for the control system to switch to the selected control configuration and for the switch to the selected control configuration to be reflected in the sensor signals.

5. The mobile machine of claim 1 wherein the first and second control configurations each correspond to a different set of machine settings.

6. The mobile machine of claim 1 wherein the first and second control configurations each correspond to a different control algorithm used by the control system.

7. The mobile machine of claim 1 wherein the SBVR logic dynamically calculates the given level for the signal-to-background-variation-ratio.

8. The mobile machine of claim 1 wherein the given level for the signal-to-background-variation-ratio is predetermined and wherein the SBVR logic identifies the predetermined signal-to-background-variation-ratio level based on a set of SBVR identification criteria.

9. The mobile machine of claim 1 and further comprising:
a user interface mechanism, the operation enhancement system outputting an indication of the better performing control configuration to the user interface mechanism.

10. The mobile machine of claim 1 wherein the controllable system comprises:
a controllable subsystem of a harvester that comprises one of a combine harvester, a cotton harvester, or a sugar cane harvester.

11. The mobile machine of claim 10 wherein the operation enhancement system generates harvesting efficiency values indicative of a harvesting efficiency of the harvester, as the enhancement criteria values, and wherein the criteria comparison logic compares the harvesting efficiency values generated based on operation of the harvester in the first control configuration to the harvesting efficiency values generated based on operation of the harvester in the second control configuration, in response to the background-variation-ratio identification logic identifying that the signal-to-background-variation-ratio has reached the given level, to identify a better performing harvester control configuration.

12. An agricultural harvester, comprising:
a controllable harvesting subsystem that performs a harvesting function;
a control system that intermittently switches between controlling the controllable harvesting subsystem using a first control configuration and a second control configuration;
a yield sensor that generates a yield signal having a yield signal value indicative of a crop yield;
a harvesting efficiency calculator that calculates a first set of harvester efficiency metrics, based on the yield signal value and indicative of a harvesting efficiency of the agricultural harvester when the controllable harvester subsystem is controlled based on the first control configuration, and that calculates a second set of harvester efficiency metrics, based on the yield signal value and indicative of a harvesting efficiency of the agricultural harvester when the controllable harvester subsystem is controlled based on the second control configuration;

signal-to-background-variation-ratio(SBVR) identification logic that controls the control system to continue intermittently switching between controlling the controllable harvesting subsystem using the first control configuration and the second control configuration until a signal-to-background-variation-ratio corresponding to the yield signal value reaches a given level; and criteria comparison logic that compares the first set of harvester efficiency metrics with the second set of harvester efficiency metrics, in response to the SBVR identification logic identifying that the signal-to-background-variation-ratio has reached the given level, to identify a better performing control configuration.

13. The agricultural harvester of claim 12 wherein the criteria comparison logic outputs an indication of the better performing control configuration to the control system, the control system controlling the controllable harvesting subsystem using the better performing control configuration based on the indication of the better performing control configuration.

* * * * *